US005887568A

United States Patent [19]

Takeyama et al.

[11] Patent Number: 5,887,568

[45] Date of Patent: Mar. 30, 1999

[54] CONTROLLER AND CONTROL METHOD FOR ENGINE IGNITION TIMING

[75] Inventors: Satoshi Takeyama; Hiroshi Iwano; Yasuo Takagi; Masaaki Uchida; Hatsuo Nagaishi, all of Yokohama, Japan

[73] Assignee: Nissan Motor Co., Ltd., Kanagawa, Japan

[21] Appl. No.: 893,717

[22] Filed: Jul. 11, 1997

[30] Foreign Application Priority Data

Jul. 12, 1996 [JP] Japan .................................... 8-183637

[51] Int. Cl.[6] ................................ F02P 5/15; F02D 43/04

[52] U.S. Cl. ............... 123/306; 123/406.26; 123/406.47; 123/406.48

[58] Field of Search .............................. 123/306, 406.23, 123/406.26, 406.47, 406.48, 406.55, 406.59, 406.64, 406.65, 478, 480, 571; 701/102, 113

[56] References Cited

U.S. PATENT DOCUMENTS 4,557,236 12/1985 Showalter ............................... 123/435
4,621,603 11/1986 Matekunas .............................. 123/435
4,624,229 11/1986 Matekunas ......................... 123/406.41
4,841,925 6/1989 Ward .................................. 123/143 B
4,915,079 4/1990 Holmes .............................. 123/406.24
5,050,556 9/1991 Williams et al. .................. 123/406.28

FOREIGN PATENT DOCUMENTS 2-245450 10/1990 Japan .

*Primary Examiner*—Tony M. Argenbright
*Attorney, Agent, or Firm*—McDermott, Will & Emery

[57] ABSTRACT

A predetermined firing delay time $B_1$ is added to a value obtained by dividing a total gas weight Gcyl in a cylinder by an unburnt gas density basic value DENS and a laminar flow flame velocity basic value FLML. The value obtained by this calculation is unit converted and then set as a basic ignition timing for which a minimum ignition advance value or MBT is obtained. In this way, ignition timing control is optimized for various engine running conditions without preparing a plurality of maps.

25 Claims, 11 Drawing Sheets

CONTROL UNIT
2
3
14
17
18
19
5
4
30
20
32
13
9
6
10
11
15
21
8
7
16
22
23
31
12
27
25
24
1
28
26
P2

CONTROLLER AND CONTROL METHOD FOR ENGINE IGNITION TIMING

The contents of Tokugan Hei P8-183637, with a filing date of Jul. 12, 1996 in Japan, are hereby incorporated by reference.

FIELD OF THE INVENTION

This invention relates to control of the ignition timing of an engine, and more particularly to an ignition timing control towards a minimum spark advance for best torque, known as MBT, required to maximize engine output torque.

BACKGROUND OF THE INVENTION

Three-way catalytic converters which perform oxidation and reduction of hydrocarbons (HC), carbon monoxide (CO) and nitrogen oxides (NOx) in the exhaust of an automobile engine, convert these noxious substances most efficiently when an air-fuel ratio of the fuel mixture supplied to the engine coincides with a stoichiometric air-fuel ratio.

In an engine equipped with such a catalytic converter, the air-fuel ratio of the air-fuel mixture is controlled for example by an electronic control unit. The ignition timing is also controlled in close relation with the air-fuel ratio control. The ignition timing control is generally performed based on a map of basic ignition timing having engine load and engine rotation speed as parameters is pre-stored in a memory provided in the control unit.

A real engine load and engine rotation speed are detected, and when these signals are input to the control unit, the map is looked up so as to determine this basic ignition timing.

A spark plug in the engine connected to an ignition coil generates a spark in accordance with this basic ignition timing so as to ignite the air-fuel mixture in a combustion chamber of the engine when a primary current flowing in the ignition coil is interrupted.

The basic ignition timing is set in the vicinity of a minimum spark advance for best torque, or MBT, which is required to maximize the engine output torque with a view to improving fuel cost-performance.

To improve the precision of this ignition timing control, the map of basic ignition timing must first be set correctly for each engine which requires many matching experiments to be performed. In particular, the required basic ignition timing varies in lean burn systems where the engine is run at a leaner air-fuel ratio than the stoichiometric air-fuel ratio under predetermined conditions. In this case the required basic ignition timing varies in a lean burn region and a non-lean burn region. Further, in engines fitted with an exhaust gas recirculation (EGR) device, the required basic ignition timing also varies according to the exhaust gas recirculation state.

When a plurality of maps are used to satisfy these requirements, the number of matching experiments increases in direct proportion to the number of maps, and the memory storage capacity required to store these maps also increases.

In Tokkai Hei 2-245450 published by the Japanese Patent Office in 1990, a pressure sensor is provided facing an engine cylinder, and a map value of basic ignition timing is corrected so that a crank angle which maximizes the rate of increase of cylinder pressure coincides with a target value. In this way, it is possible to achieve high precision MBT control without performing a large number of matching experiments.

However in such a device, a pressure sensor must be provided in the combustion chamber and this increases the manufacturing cost of the device. The lifetime of the pressure sensor is also short in comparison to that of other engine parts.

SUMMARY OF THE INVENTION

It is therefore an object of this invention to improve the precision of MBT control simply and economically.

In order to achieve the above object, this invention provides an ignition timing controller for use with an engine wherein a mixture of air aspirated into a cylinder via an intake passage and fuel is ignited by a spark plug and burnt.

The controller comprises a mechanism for calculating an ignition timing of the spark plug by the process of: (a) dividing a total gas weight in cylinder Gcyl by an unburnt gas density ROU in the cylinder and a flame velocity FLV in the cylinder; (b) adding a firing delay time $B_1$ of the spark plug to a value obtained by the process (a); and (c) converting a value obtained by the process (b) to the ignition timing, and a mechanism for sparking the spark plug with a timing based on the ignition timing.

The above process (a), (b) and (c) are expressed for example by the following equation.

$$MBTCAL = \left( B_1 + \frac{Gcyl}{ROU \cdot FLV} \right) \cdot B_2 - B_3$$

where,

MBTCAL=ignition timing $B_1$=firing delay of spark plug

Gcyl=total gas weight in cylinder

ROU=unburnt gas density in cylinder

FLV=flame velocity in cylinder $B_2$=parameter for converting time to crank angle $B_3$=crank angle correction coefficient for MBTCAL computation It is preferable that Gcyl comprises a fresh air weight, a fuel weight and a residual gas weight in the cylinder.

It is further preferable that the fresh air weight is calculated as the product of a normal air density of air aspirated into the cylinder, a stroke capacity of the cylinder and a charging efficiency of the cylinder.

It is also preferable that the residual gas weight is calculated as a function of a charging efficiency of the cylinder and a fresh air proportion in the cylinder determined by a rotation speed of the engine.

It is also preferable that the controller further comprises a mechanism for setting a laminar layer flame velocity basic value depending on a charging efficiency of the engine and a rotation speed of the engine, and a mechanism for computing FLV based on the laminar flow flame velocity basic value.

It is further preferable that the laminar flow flame velocity basic value setting mechanism comprises a mechanism for setting a laminar flow flame velocity basic value corresponding to the engine after warmup is complete, and the FLV computing mechanism comprises a mechanism for computing a correction coefficient depending on a cooling water temperature of the engine, and a mechanism for correcting the laminar flow flame velocity basic value to a smaller value by the correction coefficient.

It is also preferable that the controller further comprises a mechanism for setting an unburnt gas density basic value depending on a charging efficiency of the cylinder and a mechanism for computing ROU based on the unburnt gas density basic value.

It is further preferable that the unburnt gas density basic value setting mechanism comprises a mechanism for setting an unburnt gas density basic value corresponding to the engine after warmup is complete, and the ROU computing mechanism comprises a mechanism for computing a correction coefficient depending on the cooling water temperature of the engine and a mechanism for correcting the unburnt gas density basic value to a smaller value by the correction coefficient.

This invention also provides an ignition timing controller for use with such an engine which comprises an intake passage for aspirating air into a cylinder, a fuel injection valve for injecting fuel into the air aspirated into the cylinder so as to generate an air-fuel mixture, a spark plug for igniting and burning the air-fuel mixture in the cylinder, a mechanism for computing a basic injection amount of the fuel injection valve such that an air-fuel ratio of the air-fuel mixture is equal to a stoichiometric air-fuel ratio, a mechanism for computing a target fuel-air ratio equivalent amount for running the engine at an air-fuel ratio other than the stoichiometric air-fuel ratio, a mechanism for correcting the basic injection amount by the target fuel-air ratio equivalent amount, and a mechanism for supplying the basic injection amount corrected by the target fuel-air ratio equivalent amount, to the fuel injection valve.

The controller comprises a mechanism for calculating an ignition timing of the spark plug by the aforesaid process or equation, a mechanism for sparking the spark plug with a timing based on the ignition timing, a mechanism for computing a fuel weight equivalent coefficient depending on the target fuel-air equivalent amount, and a mechanism for calculating Gcyl using the fuel weight equivalent coefficient.

It is also preferable that the controller comprises a mechanism for calculating an ignition timing of the spark plug by the aforesaid process or equation, a mechanism for sparking the spark plug with a timing based on the ignition timing, a mechanism for setting a laminar flow flame velocity basic value corresponding to the stoichiometric air-fuel ratio, a mechanism for computing a correction coefficient depending on the target fuel-air ratio equivalent amount, and a mechanism for computing FLV by decreasing the laminar flow flame velocity basic value according to the correction coefficient.

It is also preferable that the controller comprises a mechanism for calculating an ignition timing of the spark plug by the aforesaid process or equation, a mechanism for sparking the spark plug with a timing based on the ignition timing, a mechanism for computing an unburnt gas density basic value corresponding to the stoichiometric air-fuel ratio, a mechanism for computing a correction coefficient according to the target fuel-air ratio equivalent amount, and a mechanism for computing ROU by decreasing the unburnt gas density basic value according to the correction coefficient.

This invention also provides an ignition timing controller for use with such an engine which comprises an intake passage for aspirating air into a cylinder, a fuel injection valve for injecting fuel into the air aspirated into the cylinder so as to generate an air-fuel mixture, a spark plug for igniting and burning the air-fuel mixture in the cylinder, and an exhaust recirculation mechanism for recirculating part of the exhaust gas from the cylinder into the cylinder.

The controller comprises a mechanism for calculating an ignition timing of the spark plug by the aforesaid process or equation, a mechanism for sparking the spark plug with a timing based on the ignition timing, and a mechanism for computing Gcyl by summing a fresh air weight, a fuel weight, a residual gas weight and a weight of gas recirculated by the exhaust gas recirculating mechanism in the cylinder.

It is preferable that the fresh air weight is calculated as the product of a normal air density of air aspirated into the cylinder, a stroke capacity of the cylinder and a charging efficiency of the cylinder.

It is also preferable that the controller further comprises a mechanism for calculating an exhaust gas recirculation rate of the exhaust gas recirculation mechanism, and a mechanism for calculating the recirculated gas weight depending on the exhaust gas recirculation rate.

It is also preferable that the recirculated gas weight calculating mechanism comprises a mechanism for correcting the calculated exhaust gas recirculation rate by a correction coefficient based on a difference between the calculated exhaust gas recirculation rate and a real exhaust gas recirculation rate.

It is also preferable that the controller further comprises a mechanism for setting a laminar flow flame velocity basic value when the exhaust gas recirculation rate is zero, and a mechanism for computing FLVby decreasing the laminar flow flame velocity basic value according to the exhaust gas recirculation rate.

This invention also provides an ignition timing controller for use with such an engine which comprises an intake passage for aspirating air into a cylinder, a fuel injection valve for injecting fuel into the air aspirated into the cylinder so as to generate an air-fuel mixture, a spark plug for igniting and burning the air-fuel mixture in the cylinder, and a swirl control valve for forming a swirl in the cylinder.

The controller comprises a mechanism for calculating an ignition timing of the spark plug by the aforesaid process or equation, a mechanism for sparking the spark plug with a timing based on the ignition timing, and a mechanism for computing FLV depending on an opening of the swirl control valve.

This invention also provides an ignition timing controller for use with such an engine which comprises an intake passage for aspirating air into a cylinder, a fuel injection valve for injecting fuel into the air aspirated into the cylinder so as to generate an air-fuel mixture, a spark plug for igniting and burning the air-fuel mixture in the cylinder, a mechanism for detecting an intake air volume in the intake passage, a mechanism for detecting a rotation speed of the engine, a mechanism for computing a basic injection amount of the fuel injection valve based on the intake air volume and engine rotation speed, a mechanism for computing a weighted average value of the basic injection amount, and a mechanism for supplying the weighted average value of fuel to the injection valve.

The controller comprises a mechanism for calculating an ignition timing of the spark plug by the aforesaid process or equation, a mechanism for sparking the spark plug with a timing based on the ignition timing, a mechanism for setting a charging efficiency of the cylinder by dividing the weighted average value by a weighted average value corresponding to a charging efficiency of 100%, and a mechanism for calculating Gcyl based on the charging efficiency.

This invention also provides an ignition timing control method for an engine wherein a mixture of air aspirated into a cylinder via an intake passage and fuel is ignited by a spark plug and burnt.

The method comprises the steps of calculating an ignition timing of the spark plug by the process of; (a) dividing a total gas weight in cylinder Gcylby an unburnt gas density ROU in the cylinder and a flame velocity FLV in the cylinder; (b) adding a firing delay time $B_1$ of the spark plug to a value obtained by the process (a); and (c) converting a value obtained by the process (b) to the ignition timing, and sparking the spark plug with a timing based on the ignition timing.

The above process (a), (b) and (c) are expressed for example by the following equation.

$$MBTCAL = \left( B_1 + \frac{Gcyl}{ROU \cdot FLV} \right) \cdot B_2 - B_3$$

where,

MBTCAL=ignition timing $B_1$=firing delay of spark plug

Gcyl=total gas weight in cylinder

ROU=unburnt gas density in cylinder

FLV=flame velocity in cylinder $B_2$=parameter for converting time to crank angle $B_3$=crank angle correction coefficient for MBTCAL computation, The details as well as other features and advantages of this invention are set forth in the remainder of the specification and are shown in the accompanying drawings.

DESCRIPTION OF THE PREFERRED EMBODIMENTS

Figure 1:
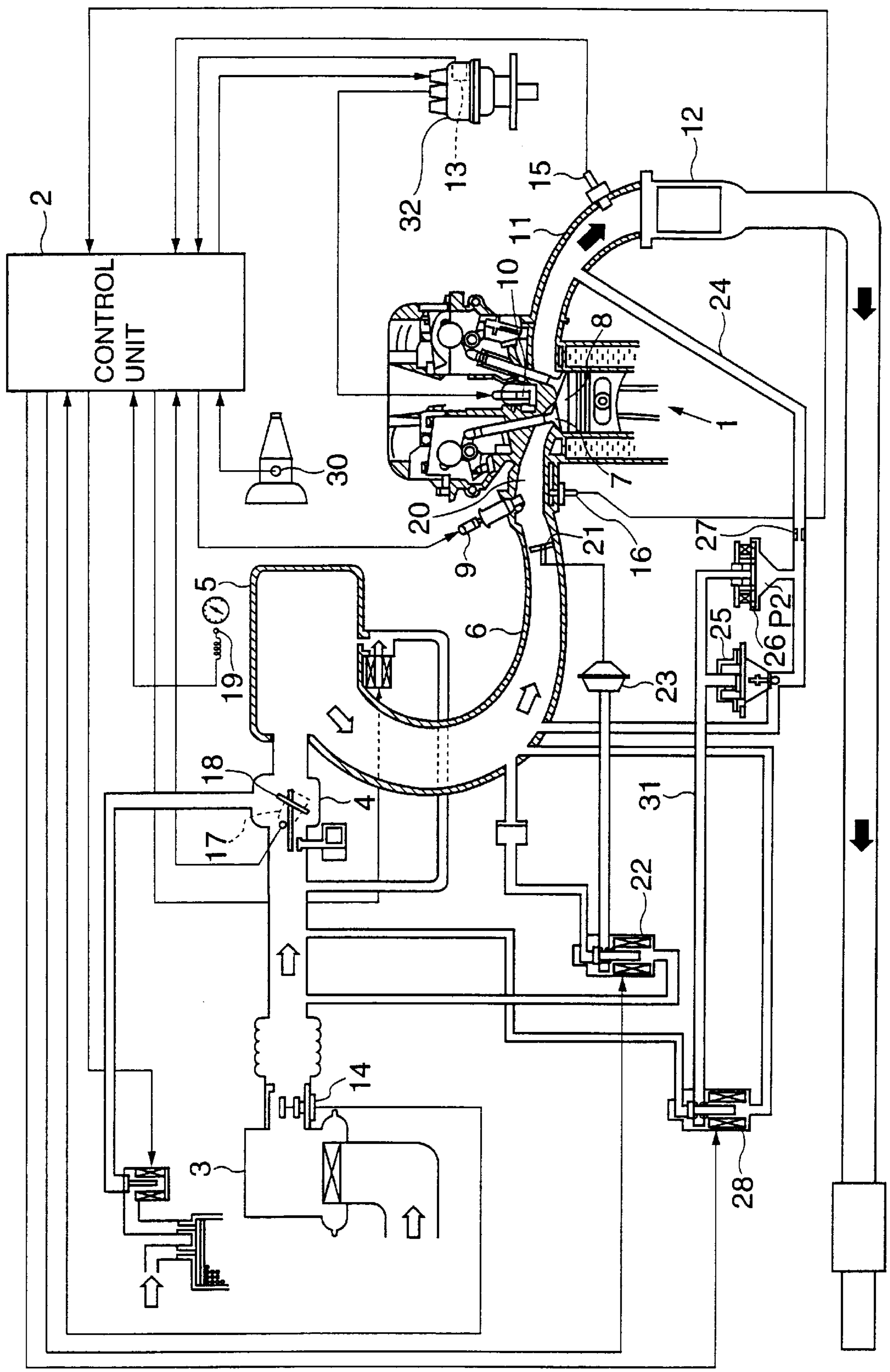
FIG. 1 is a schematic diagram of an ignition controller according to this invention.

Referring to FIG. 1 of the drawings, in a four valve type automobile engine, intake air is supplied from an air cleaner 3 to a cylinder 8 via a throttle unit 4, a collector 5 of an intake air manifold 6, intake air port 20 and primary and secondary intake valves 7. The engine 1 is a four stroke cycle, four cylinder engine in a multipoint injection system which performs fuel injection separately for each cylinder. The fuel injection is a sequential injection wherein fuel is injected once in each cylinder for every two engine rotations corresponding to the ignition sequence.

Fuel supplied to the engine 1 is injected from a fuel injection valve 9 towards an engine intake air port 20 based on an injection pulse signal emitted by the control unit 2. The control unit 2 outputs an injection pulse signal so that an air-fuel mixture having a predetermined air-fuel ratio is supplied to a cylinder 8.

The air-fuel mixture produced by the fuel injection is ignited by a spark from a spark plug 10 in the cylinder, and burnt. The spark plug 10 generates a spark due to a current from a distributor 32 in response to an ignition timing signal output by the control unit 2.

To control the air-fuel ratio and the ignition timing, a Ref signal and unit angle signal are input to the control unit 2 from a crank angle sensor 13. The Ref signal is output for every 180' degrees rotation in a four cylinder engine and for every 120' degrees rotation in a six cylinder engine, and the unit angle signal is output at 1' intervals with the Ref signal as starting point.

Also input to the control unit 2 are an intake air volume signal from an air flow meter 14, an air-fuel ratio signal from an oxygen sensor 15 installed upstream of a catalytic converter 12, a cooling water temperature signal from a water temperature sensor 16, and a throttle opening signal from a throttle sensor 17. The $O_2$ sensor 15 outputs a signal corresponding to the air-fuel ratio of the air-fuel mixture supplied to the cylinder 8 based on the oxygen concentration of the exhaust.

The control unit 2 computes a basic injection pulse width Tp of a fuel injection amount from an engine rotation speed N found from the intake air volume Q and Ref signal, and applies a correction for wall flow during acceleration or deceleration or when the engine is starting. It also maintains engine stability during a cold start, and applies a fuel correction using a target fuel-air ratio equivalent amount TFBYA0 so as to provide the required output on high load.

The control unit 2 further detects the running state of the vehicle and selectively changes over between a lean air-fuel ratio and a stoichiometric air fuel ratio according to the conditions based on a gear position signal from a gear position sensor 30 which detects a gear position of a transmission, not shown, and a vehicle speed signal from a vehicle speed sensor 19.

A three-way catalyst which reduces NOx and oxidizes HC, CO in the exhaust gas Is housed in the three-way catalytic converter 12. The three-way catalyst converts these noxious substances with maximum conversion efficiency when the vehicle Is running at the stoichiometric air-fuel ratio. Under lean burn conditions, the three-way catalyst oxidizes HC, CO, but the efficiency of reducing NOx is low. However the more the air-fuel ratio shifts to lean, the less the amount of NOx produced, and when the air-fuel ratio exceeds a certain leanness limit, NOx production decreases to the same level as if NOx were reduced by the three-way catalyst at the stoichiometric air-fuel ratio.

Fuel cost performance also improves the leaner the air-fuel ratio. Hence under predetermined engine running conditions when the engine load Is not so high, the control unit 2 sets the target fuel-air ratio equivalent amount TFBYA0 to a value less than 1.0 so as to run the vehicle at a lean air-fuel ratio, and under other conditions, the air-fuel ratio is controlled to the stoichiometric air-fuel ratio by setting TFBYA0 to 1.0.

It is known that in order to burn the air-fuel mixture efficiently at a lean air-fuel ratio, it is effective to set up a powerful swirl in the cylinder 8. This engine 1 therefore comprises a swirl control valve 21 in the intake air manifold 6. When the swirl control valve 21 is closed, a partial air flow cross-section still functions to accelerate the flow speed of intake air and guide the air flow to the primary intake valve 7.

Consequently, when the swirl control valve 21 is closed, a strong swirl is formed within the cylinder 8 and flame propagation in the thin air-fuel mixture is enhanced. The swirl control valve 21 is opened and closed by a signal from the control unit 2 via a swirl control solenoid 22 and an actuator responsive to a negative pressure.

When the signal from the control unit 2 is OFF, the swirl control solenoid 22 introduces atmospheric pressure upstream of a throttle valve 18 into a negative pressure working chamber of the actuator 23 so as to open the swirl control valve 21, and when this signal is ON, it introduces an intake negative pressure of the intake air manifold 6 into the negative pressure working chamber so as to close the swirl control valve 21.

In this way, the swirl control valve 21 is closed in the idle state after engine warmup and during lean burn conditions, whereas under any other conditions it is maintained fully open.

To improve fuel cost-performance when the engine is running under lean burn conditions, pumping losses and cooling losses must be reduced. This effect is further enhanced by performing exhaust gas recirculation (EGR), for which purpose the engine 1 is provided with an EGR valve 25 in a passage 24 which connects the exhaust passage 11 and the intake manifold 6. The EGR valve 25 is a diaphragm type valve comprising a negative pressure chamber which is held in a balance position by a negative pressure supplied to the negative pressure chamber via a negative pressure passage 31, and a spring load of a diaphragm spring that pushes the valve in a valve closing direction.

The negative pressure in the negative pressure passage 31 is feedback-controlled via a back pressure transducer (BPT) valve 26 such that an exhaust pressure $P_2$ downstream of a control orifice 27 in the passage 24 is constant.

In other words, when the exhaust pressure $P_2$ rises, the diaphragm of the BPT valve 26 is pushed toward the upper part of the diagram in opposition to the force of the spring. The BPT valve 26 supplies atmospheric pressure to the negative pressure passage 31. Thus when the diaphragm is pushed up, the cross-section of the passage in which atmospheric pressure is introduced becomes narrower, and the amount of air introduced into the negative pressure passage 31 consequently decreases.

As a result, the negative pressure in the negative pressure working chamber of the EGR valve 25 increases, the opening of the EGR valve 26 increases, and the EGR flowrate in the passage 24 increases. This has the effect of suppressing the rise of the exhaust pressure $P_2$.

Hence an EGR flowrate Qe at which the exhaust pressure $P_2$ is maintained effectively constant, is given by the following equation:

$$Qe \cong C \cdot A \cdot \sqrt{P_1 - P_2} \qquad (1)$$

where, $P_1$=exhaust pressure upstream of control orifice 27,

A=flowpath cross-sectional area of control orifice 27

C=flowrate coefficient

When the BPT valve 26 is completely closed due to rise of exhaust pressure, the EGR valve 25 is fully open due to a large negative pressure in the negative pressure working chamber. In this area, the EGR flowrate Qe is determined by the flow resistance of the control orifice 27 and EGR valve 25.

The negative pressure supplied to the negative pressure passage 31 is supplied via an EGR cut solenoid 28. The EGR cut solenoid 28 is a three-way change-over valve. When a signal from the control unit 2 is OFF, atmospheric pressure upstream of the throttle valve 18 is introduced into the negative pressure passage 31, and the EGR valve 25 closes. When this signal is ON, the intake air manifold 6 is connected to the negative pressure passage 31 so that an intake negative pressure is introduced into the passage 31.

In the engine 1 having the aforesaid construction, in order to improve fuel cost-performance, it is desirable to apply a minimum spark advance for best torque or MBT which maximizes the torque of the engine shaft, to the basic ignition timing.

To determine a basic ignition timing corresponding to an MBT according to engine load and engine rotation speed, this invention uses a computational equation based on the intake air volume and a charging efficiency obtained from the engine rotation speed.

An ignition timing computational process performed by the control unit 2 will be described with reference to flowcharts. However as this process uses some parameters used in the air-fuel ratio control process, the air-fuel ratio control process performed by the control unit 2 will be first briefly explained with reference to FIG. 2, FIG. 3 and FIG. 4. All maps and tables in these processes are looked up using an interpolation equation.

Figure 2:
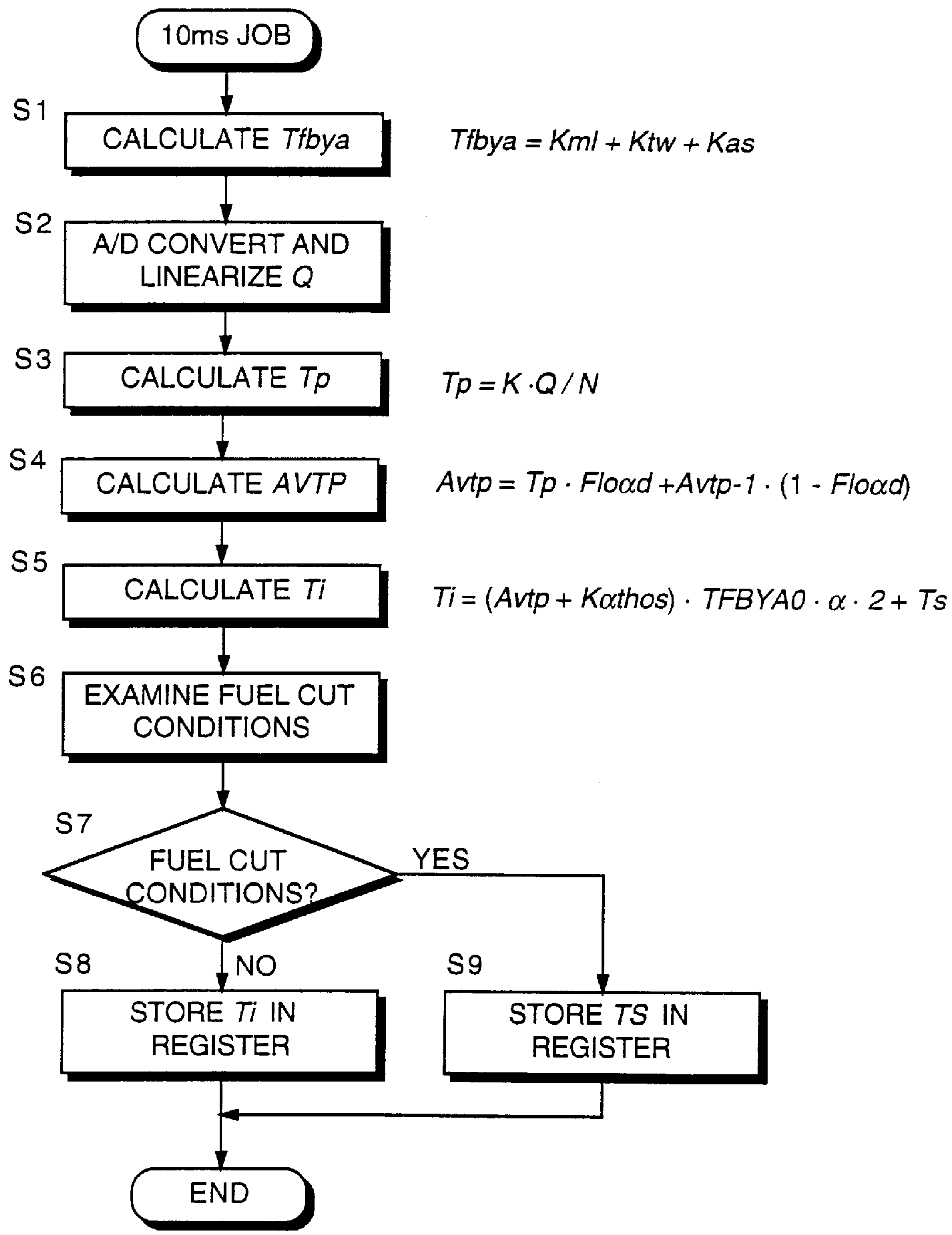
FIG. 2 is a flowchart describing a process for computing a fuel injection pulse width performed by a control unit according to this invention.

The flowchart of FIG. 2 shows a process of computing a fuel injection pulse width.

First, in a step S1, the target fuel-air ratio equivalent amount TFBYA0 is computed by the following equation:

$$TFBYA0 = Dml + Ktw + Kas \qquad (2)$$

where,

Dml=fuel-air ratio correction coefficient

Ktw=water temperature increase correction coefficient

Kas=post-startup increase correction coefficient

Herein, TFBYA0 is a value centered on 1.0 to make the air-fuel ratio richer or leaner. The post-startup correction coefficient Kas decreases at a constant rate from an initial value depending on the cooling water temperature Tw so as to finally reach 0. The water temperature increase correction coefficient Ktw is a value depending on the cooling water temperature Tw.

During a cold start when Dml=1.00, the increase correction coefficients Kas and Ktw are both positive , and as TFBYA0 is greater than 1.0, the air-fuel ratio is controlled to become richer. To find the fuel-air ratio correction coefficient Dml, the fuel-air ratio Mdml is looked up from a map having the characteristics of FIG. 5 or FIG. 6, and when the air-fuel ratio is not changed over, Mdml is taken as the fuel-air ratio correction coefficient Dml without modification. When the air-fuel ratio is changed over, the fuel-air ratio correction coefficient Dml is found by adding a predetermined damping operation. The choice of whether to use the map of FIG. 5 or the map of FIG. 6 depends on whether the engine is running with lean running conditions.

The lean running condition determining process will now be described with reference to the flowcharts of FIGS. 3 and 4. This process is executed as a background job.

Figure 3:
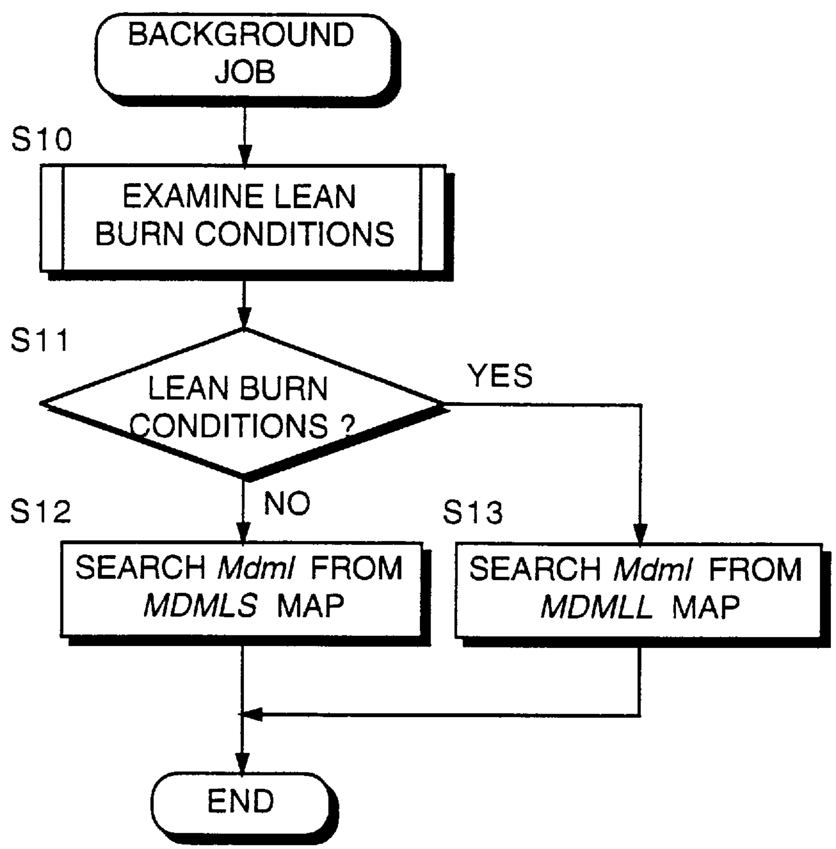
FIG. 3 is a flowchart describing a process for determining a map fuel-air ratio Mdml performed by the control unit.
Figure 4:
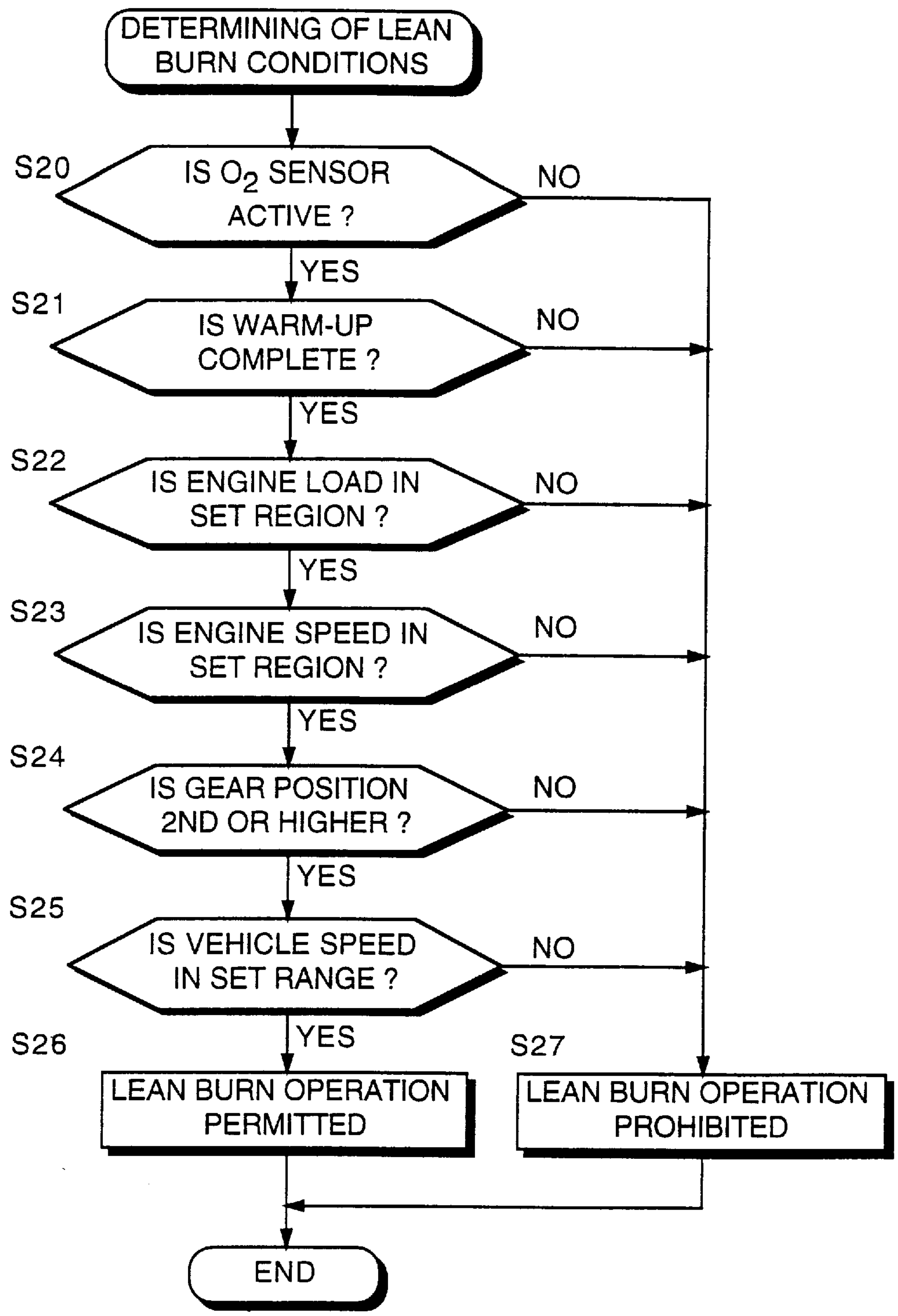
FIG. 4 is a flowchart describing a lean condition determining process performed by the control unit.

The details of how lean conditions are determined in a step S10 of FIG. 3, are shown in the flowchart of FIG. 4. When all the items of steps S20–S25 of FIG. 4 are satisfied, lean running is permitted in a step S26, and when any of the items is not satisfied, lean running is prohibited in a step S27. Each of these determining items is described as follows.

Step S20: $O_2$ sensor is activated

Step S21: engine warmup is complete

Step S22: engine load is within a predetermined lean region

Step S23: engine rotation speed is within a predetermined lean region.

Step S24: gear position is second or higher, and

Step S25: vehicle speed is within a predetermined range.

These are the conditions required to perform stable lean running without impairing driving performance. The engine load determined in the step S22 is represented by a fuel basic injection pulse width Tp or its average value Avtp.

Figure 5:
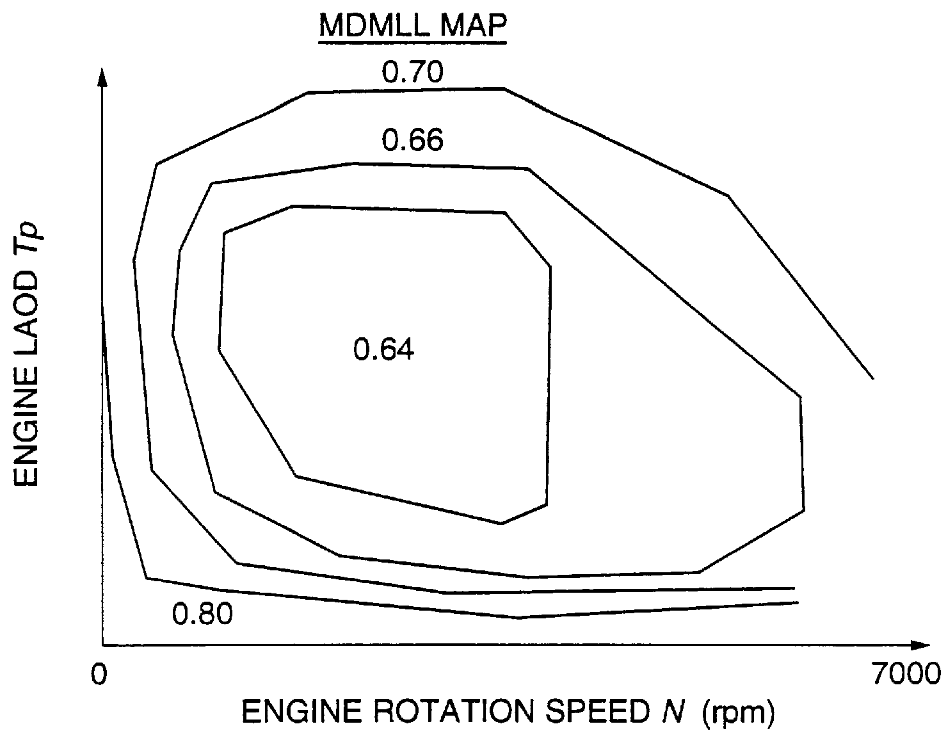
FIG. 5 is a diagram showing the characteristics of a lean map stored in the control unit.
Figure 6:
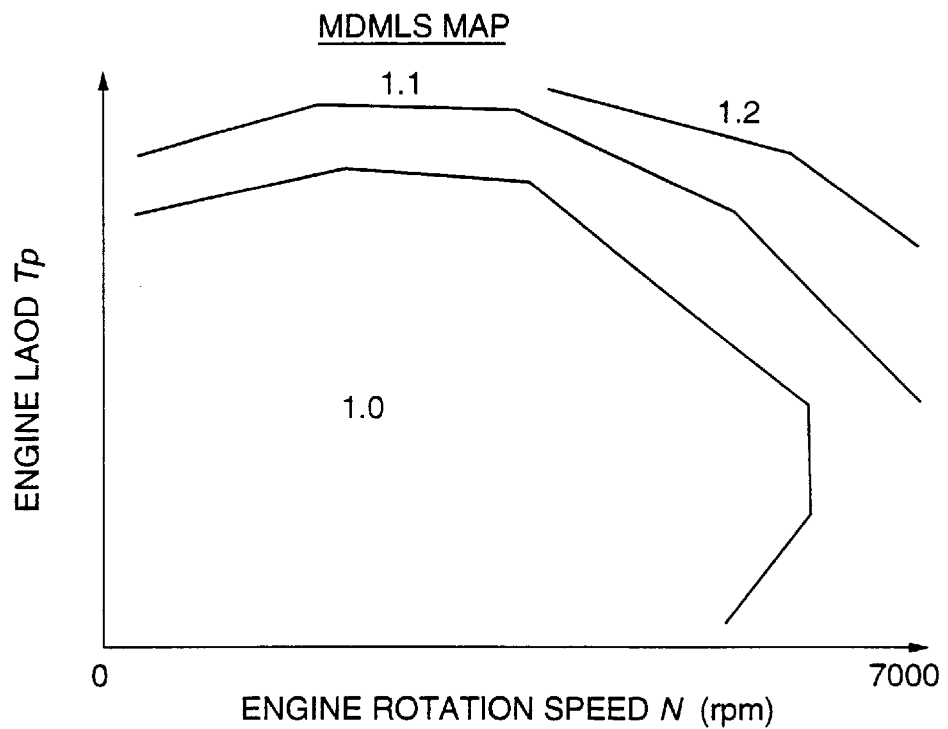
FIG. 6 is a diagram showing the characteristics of a non-lean map stored in the control unit.

After determining lean conditions in the process of FIG. 4, the routine returns to the step S1 of FIG. 3. When lean conditions do not obtain, a MDMLS map used for the stoichiometric air-fuel ratio or a rich air-fuel ratio shown in FIG. 6 is looked up in a step S12 to find the fuel-air ratio MdmL When lean conditions do obtain, a MDMLL map for a lean air-fuel ratio shown in FIG. 5 is looked up in a step S13 to find the fuel-air ratio MdmL These maps are known from U.K. Patent 2277609. The fuel-air ratio is the inverse of the air-fuel ratio, and the values shown in these maps are relative values where the stoichiometric air-fuel ratio is 1.0. Values greater than 1.0 therefore signify a correction to rich, while values less than 1.0 signify a correction to lean. The flowcharts of FIGS. 3 and 4 are also known from the aforesaid U.K. Patent 2277609.

After calculating TFBYA0 in this way, the routine returns to the process of FIG. 2, the signal output by the air flow meter 14 in the step S2 is converted to a digital signal (labelled as A/D conversion in the flowcharts), and linearization is performed so as to compute an intake air flowrate Q.

In a step S3, a basic injection pulse width Tp [ms] corresponding to the stoichiometric air-fuel ratio is found from this intake air flowrate Q and engine rotation speed N by the equation Tp=K·Q/N. K is a constant. The method of calculating the basic injection pulse width Tp is known for example from U.S. Pat. No. 5,529,043.

In a step S4, a cylinder air volume equivalent injection pulse width Avtp [ms] wherein Tp is weight averaged by the following equation (3), is calculated.

$$Avtp=Tp\cdot Fload+Avtp_{-1}\cdot(1-Fload) \quad (3)$$

where,

Fload=weighted average coefficient $Avtp_{-1}$=value of Avtp on immediately preceding occasion.

When the throttle valve 18 suddenly opens, the air flowrate flowing into the cylinder 8 increases with a first order delay based on the capacity of the intake passage relative to the variation of the output signal from the air flow meter 14. In this case, when the fuel amount corresponding to the flowrate detected by the air flow meter 14 is injected from the fuel injection valve 9, the air-fuel ratio is biased towards rich due to the delay of the increase of air flowrate. To prevent this bias, the air-fuel mixture flowing into the cylinder is controlled effectively to the stoichiometric air-fuel ratio even under these transient conditions by applying a weighted average value of the basic injection pulse width Tp. Equation (3) is known for example from U.S. Pat. No. 5,265,581.

The weighted average coefficient Fload of Equation (3) is found by referring to a predetermined map from the product N·Vcyl of the engine rotation speed N and the throttle capacity Vcyl of the cylinder 8, and the total flowpath cross-sectional area Aa. This total flowpath cross-sectional area Aa is obtained by adding the flowpath cross-sectional area of an idle adjustment valve, air regulator or the like via which air flowing into the cylinder 8 bypasses the throttle valve 17, to the flowpath cross-sectional area of the throttle valve 17.

In a step S5, a fuel injection pulse width Ti [ms] is supplied to the fuel injection valve 9 according to equation (4):

$$Ti=(Avtp+Kathos)\cdot TFBYA0\cdot\alpha\cdot 2+Ts \quad (4)$$

where,

Kathos=transient correction amount $\alpha$=air-fuel ratio feedback correction coefficient Ts=ineffectual pulse width The transient correction amount Kathos is a value which takes account of the wall flow correction.

The air-fuel ratio feedback correction coefficient $\alpha$ is a value computed based on the output signal from the $O_2$ sensor 15 such that the air-fuel ratio lies within a window having the stoichiometric air-fuel ratio as center. Apart from the case where the target air-fuel ratio equivalent amount TFBYA0 is 1.0, i.e. when the engine is purposely run with a rich or lean air-fuel mixture, the air-fuel ratio feedback correction coefficient $\alpha$ is clamped at a fixed value so that the air-fuel ratio is not feedback corrected. The ineffectual pulse width Ts is a value to compensate the operating delay from when the injection valve 9 receives an injection signal to when the valve actually opens.

Equation (4) assumes sequential injection, i.e. it assumes that one injection is performed in each cylinder for every two engine revolutions in a four stroke cycle engine. A total of two injections are therefore performed for every engine revolution in a four cylinder engine.

The fuel injection pulse width Ti expresses the injection amount for one engine revolution, and the coefficient "2" in the equation corresponds to an injection amount for two injections.

Next, in steps S6 and S7, it is determined whether or not fuel cut conditions hold. When fuel cut conditions hold, the ineffectual pulse width Ts is stored in an output register in a step S9, otherwise the fuel injection pulse width Ti calculated in Equation (4) is stored in the output register in a step S8. Due to this, fuel injection takes place with a predetermined timing corresponding to output of the Ref signal.

The injection pulse signal is output by interrupt processing using the Ref signal input as a trigger. The fuel injection valve 9 in each cylinder accordingly opens for a period Ti with the predetermined timing.

Next, the ignition control process performed by the control unit 2 will be described.

Figure 7A:
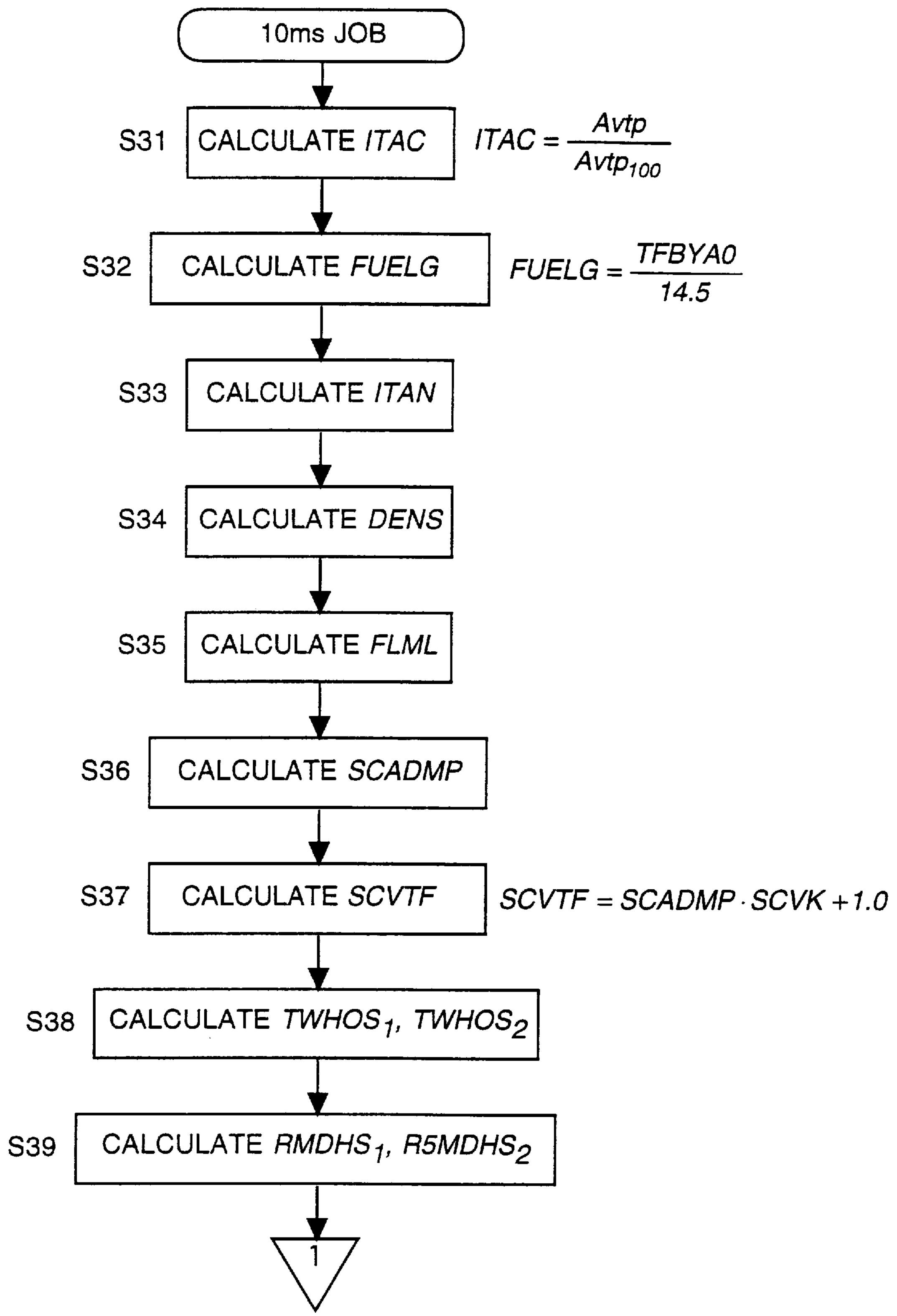
FIGS. 7A and 7B are flowcharts describing a process for computing an ignition advance value ADV performed by the control unit.
Figure 7B:
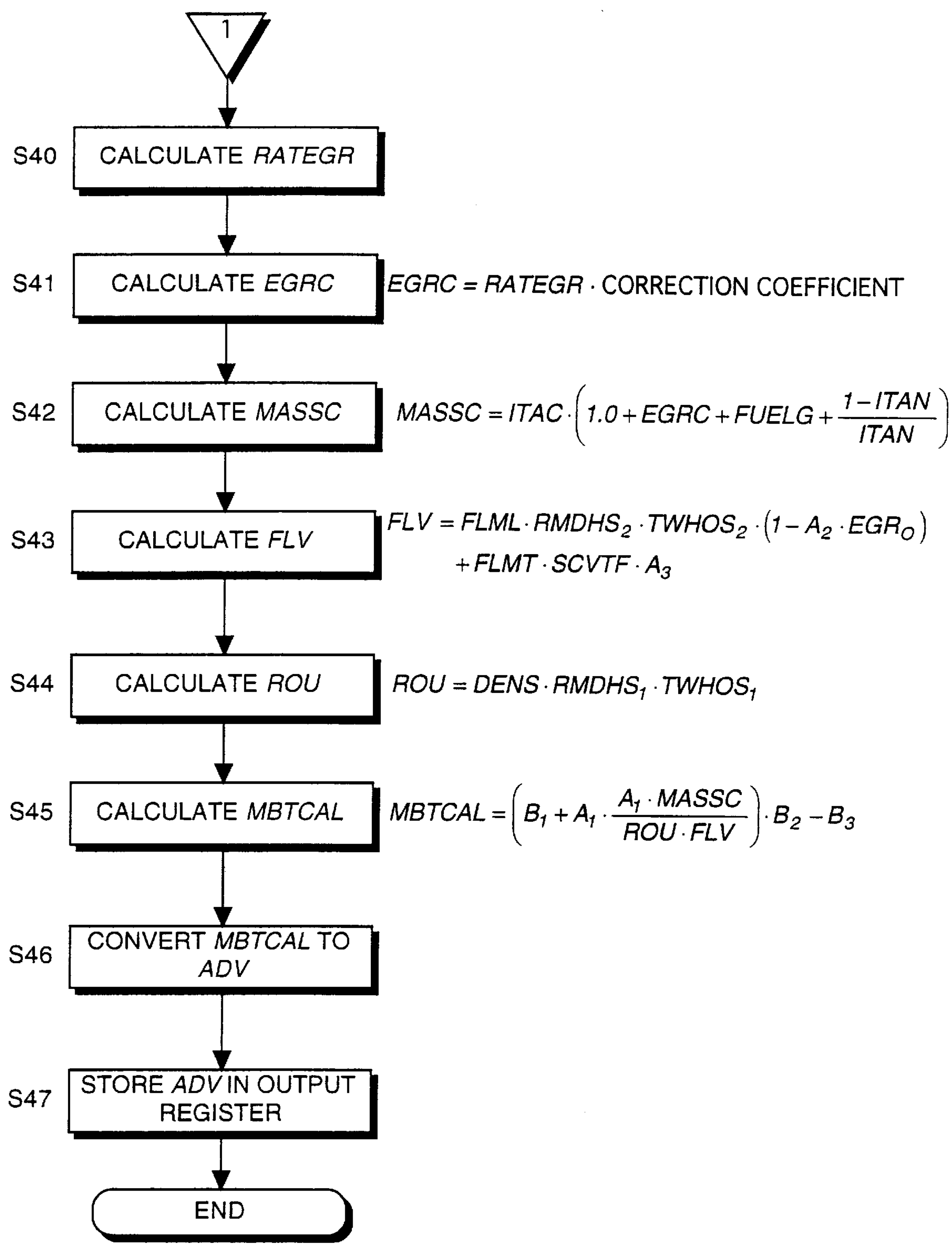

The flowcharts of FIGS. 7A, 7B show processes for computing an ignition advance value ADV which corresponds with the ignition timing represented by the crank angle relative to top dead center (TDC) of the cylinder.

This process is executed at an interval of 10 ms. The units "BTDC degrees" of the ignition advance value ADV indicate the crank angle up to top dead center (TDC), i.e. the number of degrees before TDC.

In a step S31, a charging efficiency ITAC is calculated by the following equation (5) using the cylinder air volume equivalent injection pulse width Avtp obtained in the step S4 of FIG. 2:

$$ITAC = \frac{Avtp}{Avtp_{100}} \tag{5}$$

where, $Avtp_{100}$ is a fixed value of Avtp corresponding to 100% charging efficiency.

In a step S32, a fuel weight equivalent coefficient FUELG is calculated by the following equation (6) using the target fuel-air equivalent amount TFBYA0 obtained in the step S1 of FIG. 2.

$$FUELG = \frac{TFBYA0}{14.5} \tag{6}$$

As can be seen from this equation, this value is FUELG=1.0/14.5 at the stoichiometric air-fuel ratio, and is a lesser value under lean burn conditions.

In a step S33, a fresh air proportion ITAN is found by looking up a predetermined map from the charging efficiency ITAC and engine rotation speed N. The fresh air proportion ITAN is a value showing what proportion a weight $G_{AIR}$ of fresh air which has been newly aspirated into the engine, represents relative to the sum of the weight $G_{AIR}$ of fresh air and a weight $G_{REG}$ of residual gas in the cylinder.

Figure 8:
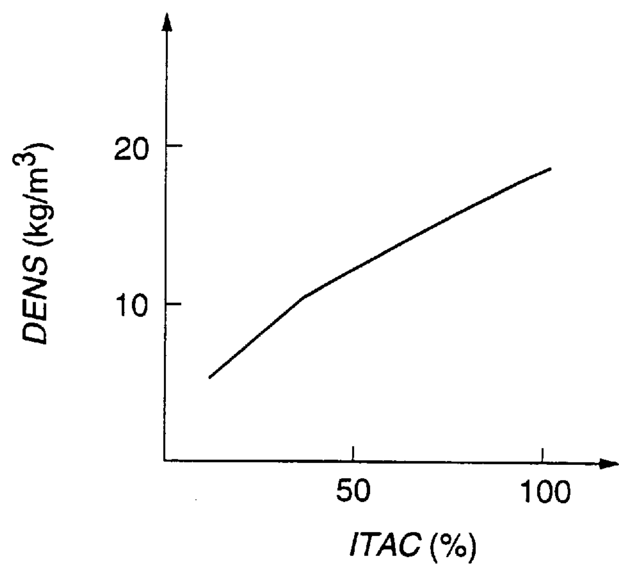
FIG. 8 is a diagram showing the characteristics of a map of an unburnt gas density basic value DENS stored in the control unit.

Likewise, in a step S34, a table of the characteristics in FIG. 8 is looked up from the charging efficiency ITAC so as to calculate an unburnt gas density basic value DENS.

Figure 9:
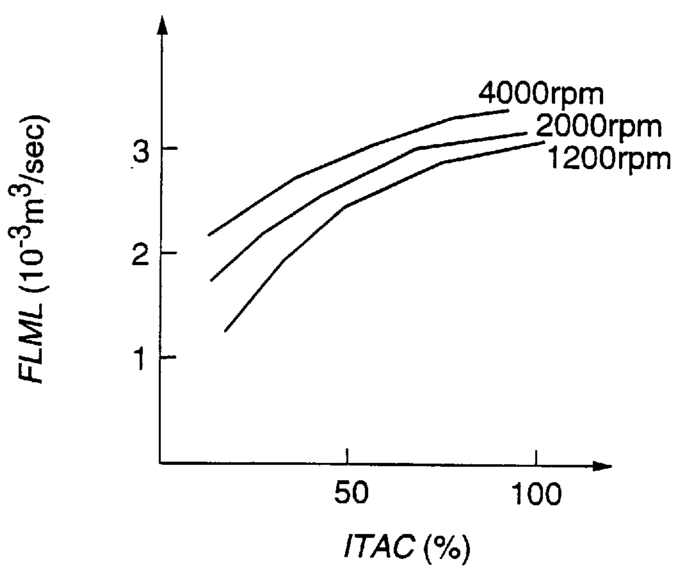
FIG. 9 is a diagram showing the characteristics of a laminar flow flame speed basic value FLML stored in the control unit.

In a step S35, a map shown in FIG. 9 is looked up from the charging efficiency ITAC and engine rotation speed N so as to find a laminar flow flame velocity basic value FLML. The laminar flow flame velocity basic value FLML is a flame propagation velocity when the gas is not moving and has no turbulence.

The unburnt gas density basic value DENS increases the larger the value of the charging efficiency ITAC as shown in FIG. 8. When the engine rotation speed N is constant as shown in FIG. 9, the laminar flow flame velocity basic value FLML increases the higher the charging efficiency ITAC, and when ITAC is constant, it increases the higher the engine rotation speed N.

Figure 10:
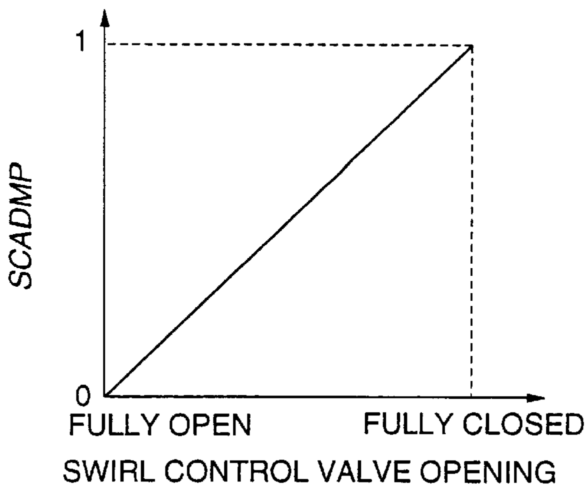
FIG. 10 is a diagram showing the characteristics of a swirl control valve coefficient SCADMP stored in the control unit.

In a step S36, a table having the characteristics shown in FIG. 10 is looked up based on the opening of the swirl control valve 21 found from the signal output by the control unit 2 to the swirl control solenoid 22, and a swirl control valve opening coefficient SCADMP is calculated.

In a step S37, a swirl correction coefficient SCVTF is calculated by the following equation (7).

$$SCVTF = SCADMP \cdot SCVK + 1.0 \tag{7}$$

where,

SCVK=matching coefficient

The swirl correction coefficient expresses the rate at which the swirl control valve 21 accelerates the flame velocity. This value is determined by the opening of the swirl control valve 21. Hence as shown in FIG. 10, when the swirl control valve 21 is fully closed this value is 1, when the swirl control valve 21 is fully open this value is 0, and it varies linearly between these two extremes depending on the opening of the swirl control valve 21. The matching coefficient SCVK of equation (7) is a constant value, but as it is different according to the shape of the intake port 20, it is set independently for each engine.

Figure 11:
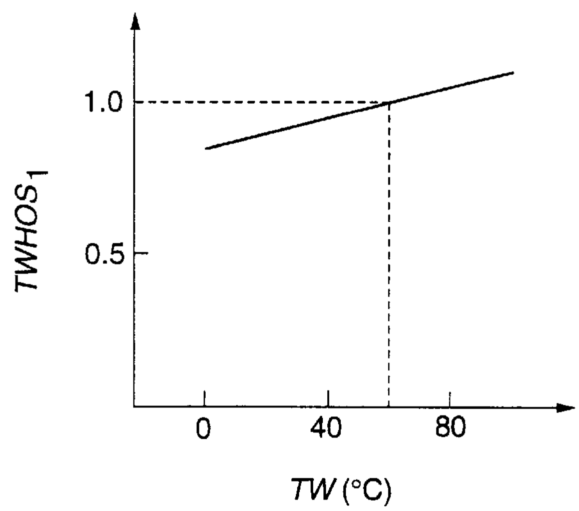
FIG. 11 is a diagram showing the characteristics of a map of a water temperature correction coefficient $TWHOS_1$ stored in the control unit.
Figure 12:
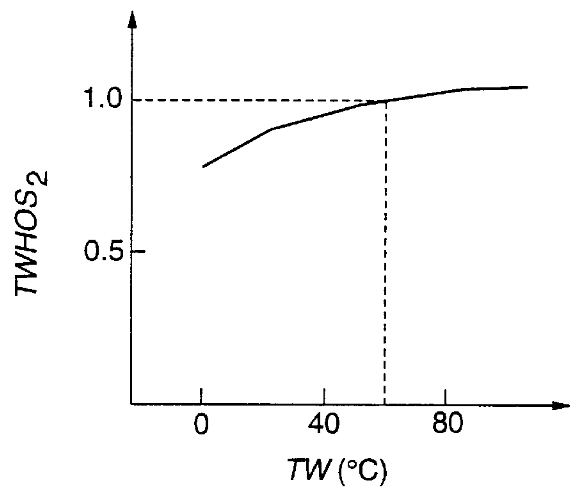
FIG. 12 is a diagram showing the characteristics of a map of a water temperature correction coefficient $TWHOS_2$ stored in the control unit.

In a step S38, the water temperature correction coefficients $TWHOS_1$ and $TWHOS_2$ are found by looking up tables having the characteristics shown in FIGS. 11 and 12 from the cooling water temperature Tw. In a step S39, the fuel-air ratio correction coefficients $RMDHS_1$ and $RMDHS_2$ are found by looking up tables having the characteristics shown in FIGS. 13 and 14 from the target fuel-air ratio equivalent amount TFBYA0.

In a step S40 in FIG. 7B, a predetermined map is looked up to find a set EGR rate RATEGR from the charging efficiency ITAC or a volume flowrate $Qh_0$ of air flowing through the throttle valve 17 and the engine rotation speed N. The set EGR rate RATEGR is a value defined by the following equation, but in an EGR device using an exhaust pressure control system wherein an EGR negative pressure is controlled by the exhaust pressure, this value may be preset as follows.

$$RATEGR = EGR \text{ gas flowrate}/(\text{fresh air flowrate} + EGR \text{ gas flowrate})$$

In a step S41, a modified EGR value EGRC is calculated by the following equation (8).

$$\text{EGRC} = \text{RATEGR} \cdot \text{correction coefficient} \tag{8}$$

The correction coefficient of Equation (8) is a constant value which shows a discrepancy between the real EGR rate and the set EGR rate RATEGR. This value is different depending on the EGR device and the engine.

In a step S42, a weight coefficient MASSC for the gas in the cylinder is calculated by the following equation (9).

$$MASSC = ITAC \cdot \left(1.0 + EGRC + FUELG + \frac{1 - ITAN}{ITAN}\right) \tag{9}$$

EGRC, FUELG and $$\frac{1 - ITAN}{ITAN}$$

on the right-hand side of equation (9) both take account of the effect of EGR, air-fuel ratio and residual gas on the weight of gas in the cylinder.

Equation (9) is derived as follows.

Taking account of EGR gas and the residual gas in the cylinder, the total weight Gcyl of gas in the cylinder is expressed by the following equation (9A).

$$Gcyl = G_{AIR} + G_{EGR} + G_{FUEL} + G_{REG} \tag{9A}$$

where, $G_{AIR}$=weight of new air $G_{EGR}$=weight of EGR gas $G_{FUEL}$=weight of fuel $G_{REG}$=weight of residual gas Here, the weights in equation (9A) are expressed by the following equations (9B)–(9E).

$$G_{AIR} = \rho_0 \cdot VCYI \cdot ITAC \tag{9B}$$

where, $\rho_0$=normal air density

Vcyl=stroke volume of cylinder $$G_{EGR} = G_{AIR} \cdot EGRC \quad (9C)$$

$$G_{FUEL} = G_{AIR} \cdot FUELG \quad (9D)$$

$$G_{REG} = G_{AIR} \cdot \frac{1 - ITAN}{ITAN} \quad (9E)$$

$$\left( \because ITAN = \frac{G_{AIR}}{G_{AIR} + G_{REG}} \right)$$

Substituting equations (9A)–(9E) into equation (9A), the following equation (9F) is obtained.

$$Gcyl = \rho_0 \cdot Vcyl \cdot ITAC \cdot \left( 1 + EGRC + FUELG + \frac{1 - ITAN}{ITAN} \right) \quad (9F)$$

If in equation (9F), we put:

$$A_1 = \rho_0 \cdot Vcyl \text{ (constant value)} \quad (9G)$$

$$MASSC = ITAC \cdot \left( 1 + EGRC + FUELG + \frac{1 - ITAN}{ITAN} \right) \quad (9H)$$

equation (9F) may be written as $GcyI=A_1 \cdot MASSC$. Equation (9) is equivalent to the aforesaid equation (9H), i.e., MASSC expresses the ratio of the gas weight Gcyl in the cylinder to an air weight $A_1$ of the same volume in the normal state.

$A_1$ in equation (9G) represents the air weight in the cylinder when ITAC=100%. This value is a constant determined by the specification of the cylinder.

Next, in a step S43, a flame velocity FLV is calculated by equation (10):

$$FLV=FLML \cdot RMDHS_2 \cdot TWHOS_2 \cdot (1-A_2 \cdot EGR_0)+FLMT \cdot SCVTF \cdot A_3 \quad (10)$$

where, $A_2$=flame velocity correction coefficient $A_3$=flame velocity correction coefficient $EGR_0$=EGR correction coefficient FLMT=flame velocity basic value for turbulent flow (fixed value)

The first term on the right-hand side of equation (10) is the flame velocity in the absence of swirl, and the second term on the right-hand side shows the improvement of flame velocity due to swirl.

In the first term on the right-hand side, $RMDHS_2$ shows the effect of the air-fuel ratio (target fuel-air ratio equivalent amount TFBYA0) on the laminar flow flame velocity, and $TWHOS_2$ shows the effect of the cooling water temperature Tw on the laminar flow flame velocity. The laminar flow flame velocity basic value FLML is a value adjusted assuming that the air-fuel ratio of the air-fuel mixture is the stoichiometric air-fuel ratio, i.e. TFBYA0=1.0, and that engine warmup is complete, i.e. the cooling water temperature is 60° C. or more. Hence even after engine warmup is complete, the flame velocity is retarded when the air-fuel ratio is not the stoichiometric air-fuel ratio. This was confirmed experimentally by the inventors. Further, even when the air-fuel ratio is the stoichiometric air-fuel ratio, the flame velocity is somewhat retarded before engine warmup is complete.

Therefore when FLML is used without modification when the air-fuel ratio is not the stoichiometric air-fuel ratio or before engine warmup is complete, the flame velocity is estimated to be higher than it actually is.

Figure 13:
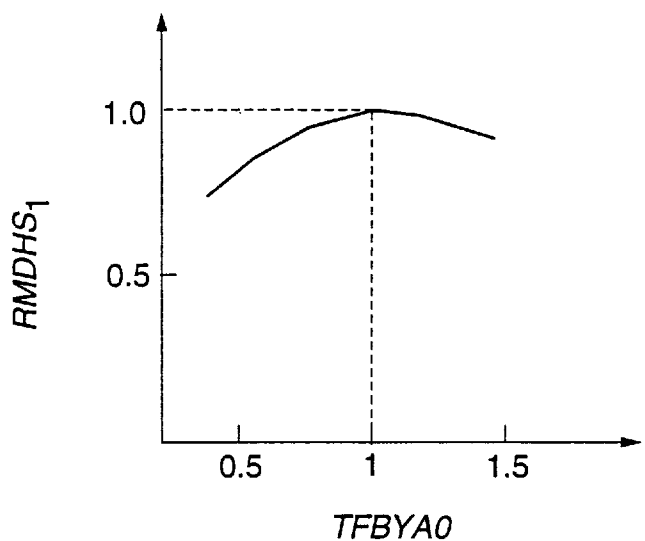
FIG. 13 is a diagram showing the characteristics of a map of a fuel-air ratio correction coefficient $RMDHS_1$ stored in the control unit.
Figure 14:
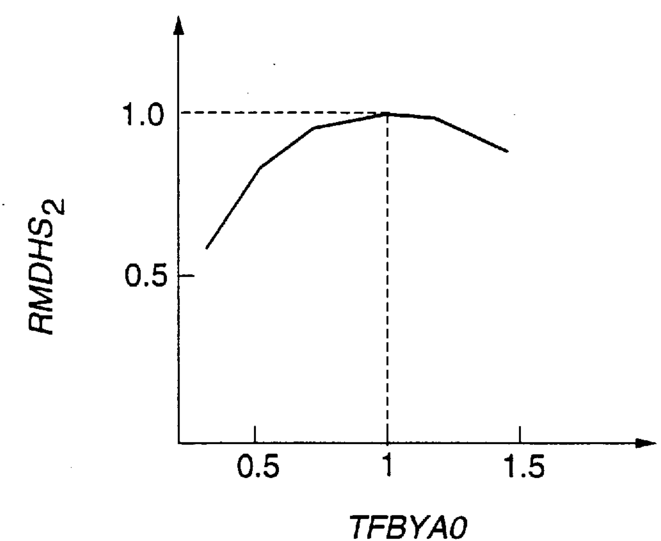
FIG. 14 is a diagram showing the characteristics of a map of a fuel-air ratio correction coefficient $RMDHS_2$ stored in the control unit.

For this purpose, when the air-fuel ratio is not the stoichiometric air-fuel ratio, FLML is corrected to a smaller value by $RMDHS_2$ as shown in FIG. 14, and before engine warmup is complete, the stratified flow flame velocity is computed with high precision by correcting FLML to a smaller value by $TWHOS_2$ as shown in FIG. 13.

By means of the aforesaid processing, the ignition timing can be maintained at MBT.

The EGR correction coefficient $EGR_0$ which is the first term on the right-hand side of equation (10) is a value required when EGR is performed, and is computed from the set EGR rate and the fresh air proportion ITAN. As the flame velocity is slower during EGR than when EGR is cut, it is corrected to a smaller value by $EGR_0$. The coefficient $A_2$ is a constant value set for each engine.

FLMT is a fixed value determined by performing a fish hook experiment on the ignition timing when the swirl control valve 21 is fully closed. In the fish hook experiment, for a constant engine rotation speed and constant throttle opening, the ignition timing is varied so as to establish the point at which maximum torque is generated in order to find an optimum ignition timing (MBT). If FLMT is used without modification when the swirl control valve 21 is in the fully open position or at an intermediate opening when it is not yet fully open, the improvement of flame velocity due to swirl is estimated to be larger than it actually is so that the ignition timing is not MBT. Therefore as shown in FIG. 10, when the swirl control valve has an intermediate opening, FLMT is corrected to a smaller value by a swirl correction coefficient SCVTF. The improvement of flame velocity due to swirl when the swirl control valve 21 has an intermediate opening may therefore be computed with good precision.

The parameter $A_3$ is a value which is directly proportional to the engine rotation speed N.

In a step S44, an unburnt gas density ROU is calculated by the following equation (11):

$$ROU=DENS \cdot RMDHS_1 \cdot TWHOS_1 \quad (11)$$

In equation (11), $TWHOS_1$ expresses the effect of the cooling water temperature Tw on unburnt gas density, and $RMDHS_1$ expresses the effect of the air-fuel ratio (target fuel-air ratio equivalent amount TFBYA0) on unburnt gas density. As in the case of the aforesaid laminar flow flame velocity basic value FLML, the unburnt gas density basic value DENS is set assuming that the air-fuel ratio is the stoichiometric air-fuel ratio and engine warmup is complete. It was therefore confirmed in the inventors' experiments that when the air-fuel ratio is not the stoichiometric air-fuel ratio, the unburnt gas density is smaller even after engine warmup is complete. The unburnt gas density is smaller before engine warmup is complete even when the air-fuel mixture has the stoichiometric air-fuel ratio. Therefore when DENS is used without modification under these conditions, the unburnt gas density is estimated higher than it actually is. For this reason, when the air-fuel ratio is not the stoichiometric air-fuel ratio, DENS is corrected to a smaller value by $RMDHS_1$ as shown in FIG. 13, and before engine warmup is complete, DENS is corrected to a smaller value by $TWHOS_1$ as shown in FIG. 11. Consequently, the unburnt gas density is computed with high precision even when the air-fuel ratio is not the stoichiometric air-fuel ratio or before engine warmup is complete.

Hence using the calculated total gas mass MASSC in the cylinder, flame velocity FLV and unburnt gas density ROU, MBTCAL (°BTDC) which is the computed value of MBT is calculated by the following equation (12) in a step S45:

$$MBTCAL = \left( B_1 + A_1 \cdot \frac{MASSC}{ROU \cdot FLV} \right) \cdot B_2 - B_3 \quad (12)$$

where, $B_1$=ignition delay timing $B_2$=parameter for converting time to crank angle $B_3$=crank angle correction coefficient for MBTCAL computation Herein, the minimum ignition advance value MBT is the ignition advance value when the ignition timing is set so that a crank angle at which the internal pressure of the cylinder during combustion is a maxinum, coincides with a predetermined crank angle (10' or 15') after top dead center of the compression.

In this case, according to the prior art, MBT was used as a basic ignition timing, and a map of basic ignition timing having load and rotation speed as parameters was first found by experiment. According to this invention however, MBT is quantized by a computational equation.

In equation (12), $$\frac{MASSC}{ROU \cdot FLV}$$

expresses a time (combustion time) in which the flame reaches all the unburnt gas in the cylinder. Logically, this value is in units of mfiliseconds.

According to this invention, the ignition advance value at which MBT is obtained is determined by converting the sum of this combustion time and the ignition delay time $B_1$ [ms] to crank angle units by the conversion parameter $B_2$.

From equation (12), when the flame velocity FLV is constant, the time required for combustion is longer the larger the total weight Gcyl of gas in the cylinder. In this case, the value of MBTCAL is shifted to earlier. Also when the total weight Gcyl of gas in the cylinder is constant, the time required for combustion is shorter the higher the flame velocity FLV. In this case, the value of MBTCAL is shifted to later. Further even when the time required for combustion is constant, the crank angle interval corresponding to this time varies with the engine rotation speed. MBTCAL must therefore be advanced the higher the engine rotation speed, so the conversion parameter $B_2$ is arranged to be directly proportional to the rotation speed N. $B_1$ and $B_3$ are constant values set for each engine. Once the computational value of MBT, MBTCAL, is calculated, this value MBTCAL is converted to an ignition advance value ADV (°BTDC) in a step S46. This value of ADV is then stored in an output register for performing ignition in a step S47. In this way, the spark plug 10 is fired with a predetermined timing according to the output signal from the crank angle sensor.

As in the case of injection, ignition is also performed by interrupt processing using a Ref signal as a trigger. If the Ref signal is for example 70° BTDC, the primary current in the ignition coil is interrupted and ignition is performed when the counter value of a unit angle signal coincides with 70° —ADV.

In a conventional MBT control system using a map of basic ignition timing, a large number of matching tests were required corresponding to engine load and engine rotation speed. According to this invention however, an ignition advance value which gives MBT is obtained by a unique computational equation which basically uses the intake air flowrate and engine rotation speed, hence the MBT computation equation may be set up by a smaller number of experiments. This is advantageous for shortening the time required to develop the ignition timing controller, and the memory capacity of the control unit is also less.

For example, all the following conditions must be satisfied in order to combine the ignition timing controller according to this invention with the exhaust converter of a conventional three-way catalyst system.

(1) The air-fuel ratio of the combustion mixture is the stoichiometric air-fuel ratio, i.e. TFBYA0=1.0.

(2) The cooling water temperature is of the order of 80° C. after engine warmup is complete.

(3) EGR is cut.

Under these conditions, EGRC=0, FUELG=1.0/14.5, $RMDHS_2$=1, $TWHOS_2$=1, $EGR_0$=0, SCVTF=0, $RMDHS_1$=1 and $TWHOS_1$=1. MASSC, FLV and ROU are therefore expressed by the following equations (9')–(11').

$$MASSC = ITAC \cdot \left( 1.0 + \frac{1.0}{14.5} + \frac{1 - ITAN}{ITAN} \right) \quad (9')$$

$$FLV = FLML \quad (10')$$

$$ROU = DENS \quad (11')$$

From equations (9')–(11'), the MBT computed value MBTCAL is expressed by the following equation (12'):

$$MBTCAL = \left\{ B_1 + A_1 \cdot \frac{ITAC \cdot \left( 1.0 + \frac{1.0}{14.5} + \frac{1 - ITAN}{ITAN} \right)}{DENS \cdot FLML} \right\} \cdot B_2 - B_3 \quad (12)$$

In equation (12'), ITAC is a calculated value obtained from the engine load and rotation speed, ITAN is a map value, DENS is a table value and all the remaining quantities are constants. Matching tests must therefore be performed for ITAN, DENS, $B_1$, $A_1$, FLML, $B_2$ and $B_3$.

In this case, for matching ITAN, fewer experiments are required than for matching the conventional map of basic ignition timing, and for the filling efficiency ITAC and engine rotation speed N, only 16 data need be taken in all. For the unburnt gas density basic value DENS, as shown in FIG. 8, there is not much variation relative to ITAC, and data of sufficiently high precision may be obtained from a small number of experiments. Moreover as $B_1$, $A_1$, FLML, $B_2$ and $B_3$ are all constants, not many experiments are required to determine them.

According to this invention, when the engine is run at a lean air-fuel ratio, an ignition advance value which gives MBT for lean running may be obtained using the same computational equation for MBTCAL, simply by adding the calculation of FUELG and the looking up of the table of SCADMP shown in FIG. 10 to the ignition timing control process for the stoichiometric air-fuel ratio. When EGR is performed in addition to running the engine at a lean air-fuel ratio, the ignition advance value which gives MBT for lean running during EGR may again be obtained by the same computational equation for MBTCAL simply by further adding the calculation of EGRC.

Hence in comparison to the conventional MBT control system using a three-way catalytic converter together with a map of basic ignition timing, or to the case where different maps of basic ignition timing are used in a lean burn region and a non-lean burn region or during EGR and during EGR cut in an engine fitted with a lean burn system or EGR device, according to the ignition timing controller of this invention, the computational equation for MBT may be set with only approximately ⅕ of the amount of experiment that was conventionally required even allowing for the inclusion of the measurement of ITAN.

According to this invention, even in a lean burn system or when EGR is performed, a correct match can be achieved by measuring only specific points. In the prior art, experimental data had to be obtained for all points on the parameter grid, however a plurality of representative points are all that is required for the ignition timing controller of this invention. In experiments carried out by the inventors, the amount of memory required by this ignition timing controller in a lean burn system where EGR is performed was ⅕ of that in a conventional controller using high octane gasoline or regular gasoline.

Figure 15:
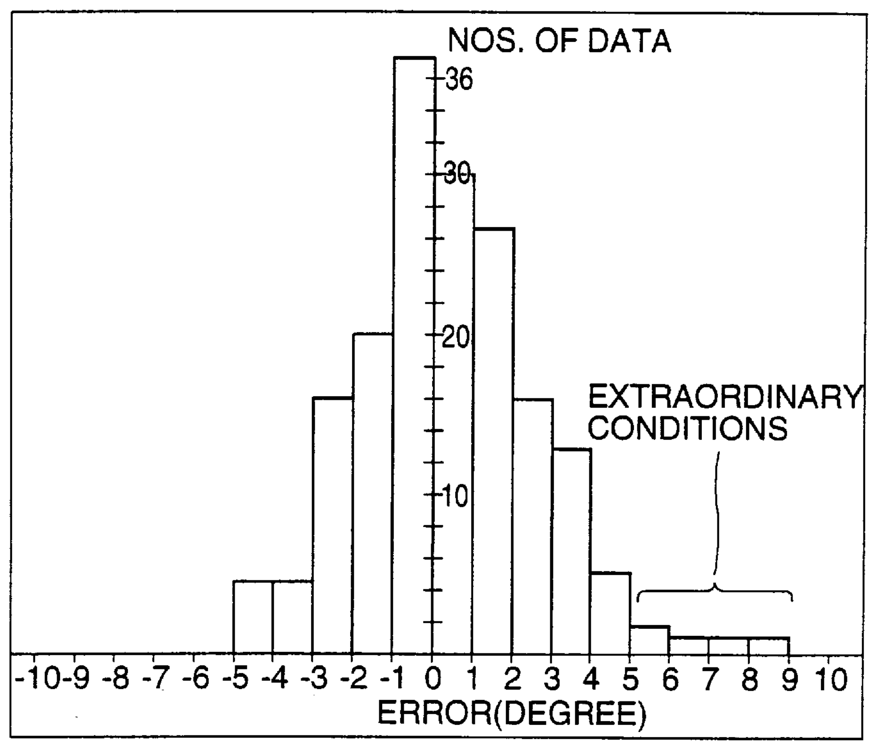
FIG. 15 is a diagram describing control results obtained by the ignition timing controller.

To find out how precise is the MBT computed value MBTCAL obtained from the above equation (12), the inventors drew a histogram shown in FIG. 15 illustrating the error between this MBT computed value MBTCAL and data obtained from a MBT measurement experiment (the aforesaid fish hook experiment). According to this diagram, the average difference between detailed MBT measurement test data and the MBT computed value obtained from equation (12) was within 1°–3°. Excepting for a specific region, the maximum error was also within 5°, thereby showing that the MBT control value MBTCAL obtained by this ignition timing controller is sufficiently precise for practical purposes.

According to this invention, the pressure sensor used in the aforesaid Tokkai Hei 2-245450 is unnecessary. The cost of the controller is therefore low and it has high reliability. The above embodiment was described in the case of an engine fitted with an exhaust pressure control system EGR mechanism, but it may be applied also to engines fitted with other types of EGR mechanism.

Further this embodiment was described in the context of its application to an engine comprising a lean burn system and an EGR device, but it will of course be understood that it may be applied also to a lean burn engine not comprising an EGR mechanism, or to an engine comprising only a three-way catalytic converter.

The embodiments of this invention in which an exclusive property or privilege is claimed are defined as follows:

1. An ignition timing controller for use with an engine wherein a mixture of air aspirated into a cylinder via an intake passage and fuel is ignited by a spark plug and burnt, comprising:

means for calculating an ignition timing of said spark plug by the process of:

(a) dividing a total gas weight in cylinder Gcyl by an unburnt gas density ROU in said cylinder and a flame velocity FLVin said cylinder;

(b) adding a firing delay time $B_1$ of said spark plug to a value obtained by the process (a); and (c) converting a value obtained by the process (b) to said ignition timing, and means for sparking said spark plug with a timing based on said ignition timing.

2. An ignition timing controller as defined in claim 1, wherein Gcyl comprises a fresh air weight, a fuel weight and a residual gas weight in said cylinder.

3. An ignition timing controller as defined in claim 2, wherein said fresh air weight is the product of a normal air density of air aspirated into said cylinder, a stroke capacity of said cylinder and a charging efficiency of said cylinder.

4. An ignition timing controller as defined in claim 2, wherein said residual gas weight is a function of a charging efficiency of said cylinder and a fresh air proportion in said cylinder determined by a rotation speed of the engine.

5. An ignition timing controller as defined in claim 1, further comprising means for setting a laminar layer flame velocity basic value depending on a charging efficiency of said engine and a rotation speed of the engine, and means for computing FLV based on said laminar flow flame velocity basic value.

6. An ignition timing controller as defined in claim 5, wherein said laminar flow flame velocity basic value setting means comprises means for setting a laminar flow flame velocity basic value corresponding to the engine after warmup is complete, and said FLV computing means comprises means for computing a correction coefficient depending on a cooling water temperature of the engine, and means for correcting said laminar flow flame velocity basic value to a smaller value by said correction coefficient.

7. An ignition timing controller as defined in claim 1, further comprising means for setting an unburnt gas density basic value depending on a charging efficiency of said cylinder and means for computing ROU based on said unburnt gas density basic value.

8. An ignition timing controller as defined in claim 7, wherein said unburnt gas density basic value setting means comprises means for setting an unburnt gas density basic value corresponding to the engine after warmup is complete, and said ROU computing means comprises means for computing a correction coefficient depending on the cooling water temperature of said engine and means for correcting said unburnt gas density basic value to a smaller value by said correction coefficient.

9. An ignition timing controller for use with an engine wherein a mixture of air aspirated into a cylinder via an intake passage and fuel is ignited by a spark plug and burnt, comprising:

means for calculating an ignition timing of said spark plug using the following equation:

$$MBTCAL = \left( B_1 + \frac{Gcyl}{ROU \cdot FLV} \right) \cdot B_2 - B_3$$

where,

MBTCAL=ignition timing $B_1$=firing delay of spark plug

Gcyl=total gas weight in cylinder

ROU=unburnt gas density in cylinder

FLV=flame velocity in cylinder $B_2$=parameter for converting time to crank angle $B_3$=crank angle correction coefficient for MBTCAL computation, and means for sparking said spark plug with a timing based on said ignition timing.

10. An ignition timing controller for use with an engine, said engine comprising an intake passage for aspirating air into a cylinder, a fuel injection valve for injecting fuel into the air aspirated into said cylinder so as to generate an air-fuel mixture, a spark plug for igniting and burning said air-fuel mixture in said cylinder, means for computing a basic injection amount of said fuel injection valve such that an air-fuel ratio of said air-fuel mixture is equal to a stoichiometric air-fuel ratio, means for computing a target fuel-air ratio equivalent amount for running said engine at an air-fuel ratio other than said stoichiometric air-fuel ratio, means for correcting said basic injection amount by said target fuel-air ratio equivalent amount, and means for supplying said basic injection amount corrected by the target fuel-air ratio equivalent amount, to said fuel injection valve, said controller comprising:

means for calculating an ignition timing of said spark plug by the process of:

(a) dividing a total gas weight in cylinder Gcyl by an unburnt gas density ROU in said cylinder and a flame velocity FLV in said cylinder;

(b) adding a firing delay time $B_1$ of said spark plug to a value obtained by the process (a); and (c) converting a value obtained by the process (b) to said ignition timing, means for sparking said spark plug with a timing based on said ignition timing, means for computing a fuel weight equivalent coefficient depending on said target fuel-air equivalent amount, and means for calculating Gcyl using said fuel weight equivalent coefficient.

11. An ignition timing controller for use with an engine, said engine comprising an intake passage for aspirating air into a cylinder, a fuel injection valve for injecting fuel into the air aspirated into said cylinder so as to generate an air-fuel mixture, a spark plug for igniting and burning said air-fuel mixture in said cylinder, means for computing a basic injection amount of said fuel injection valve such that an air-fuel ratio of said air-fuel mixture is equal to a stoichiometric air-fuel ratio, means for computing a target fuel-air ratio equivalent amount for running said engine at an air-fuel ratio other than said stoichiometric air-fuel ratio, means for correcting said basic injection amount by said target fuel-air ratio equivalent amount, and means for supplying said basic injection amount corrected by the target fuel-air ratio equivalent amount, to said fuel injection valve, said controller comprising:

means for calculating an ignition timing of said spark plug using the following equation:

$$MBTCAL = \left( B_1 + \frac{Gcyl}{ROU \cdot FLV} \right) \cdot B_2 - B_3$$

where,

MBTCAL=ignition timing $B_1$=firing delay of spark plug

Gcyl=total gas weight in cylinder

ROU=unburnt gas density in cylinder

FLV=flame velocity in cylinder $B_2$=parameter for converting time to crank angle $B_3$=crank angle correction coefficient for MBTCAL computation, means for sparking said spark plug with a timing based on said ignition timing, means for setting a laminar flow flame velocity basic value corresponding to said stoichiometric air-fuel ratio, means for computing a correction coefficient depending on said target fuel-air ratio equivalent amount, and means for computing FLV by decreasing said laminar flow flame velocity basic value according to said correction coefficient.

12. An ignition timing controller for use with an engine, said engine comprising an intake passage for aspirating air into a cylinder, a fuel injection valve for injecting fuel into the air aspirated into said cylinder so as to generate an air-fuel mixture, a spark plug for igniting and burning said air-fuel mixture in said cylinder, means for computing a basic injection amount of said fuel injection valve such that an air-fuel ratio of said air-fuel mixture is equal to a stoichiometric air-fuel ratio, means for computing a target fuel-air ratio equivalent amount for running said engine at an air-fuel ratio other than said stoichiometric air-fuel ratio, means for correcting said basic injection amount by said target fuel-air ratio equivalent amount, and means for supplying said basic injection amount corrected by the target fuel-air ratio equivalent amount, to said fuel injection valve, said controller comprising:

means for calculating an ignition timing of said spark plug by the process of:

(a) dividing a total gas weight in cylinder Gcyl by an unburnt gas density ROU in said cylinder and a flame velocity FLV in said cylinder;

(b) adding a firing delay time $B_1$ of said spark plug to a value obtained by the process (a); and (c) converting a value obtained by the process (b) to said ignition timing, means for sparking said spark plug with a timing based on said ignition timing, means for computing an unburnt gas density basic value corresponding to said stoichiometric air-fuel ratio, means for computing a correction coefficient according to said target fuel-air ratio equivalent amount, and means for computing ROU by decreasing said unburnt gas density basic value according to said correction coefficient.

13. An ignition timing controller for use with an engine, said engine comprising an intake passage for aspirating air into a cylinder, a fuel injection valve for injecting fuel into the air aspirated into said cylinder so as to generate an air-fuel mixture, a spark plug for igniting and burning said air-fuel mixture in said cylinder, means for computing a basic injection amount of said fuel injection valve such that an air-fuel ratio of said air-fuel mixture is equal to a stoichiometric air-fuel ratio, means for computing a target fuel-air ratio equivalent amount for running said engine at an air-fuel ratio other than said stoichiometric air-fuel ratio, means for correcting said basic injection amount by said target fuel-air ratio equivalent amount, and means for supplying said basic injection amount corrected by the target fuel-air ratio equivalent amount, to said fuel injection valve, said controller comprising:

means for calculating an ignition timing of said spark plug using the following equation:

$$MBTCAL = \left( B_1 + \frac{Gcyl}{ROU \cdot FLV} \right) \cdot B_2 - B_3$$

where,

MBTCAL=ignition timing $B_1$=firing delay of spark plug

Gcyl=total gas weight in cylinder

ROU=unburnt gas density in cylinder

FLV=flame velocity in cylinder $B_2$=parameter for converting time to crank angle $B_3$=crank angle correction coefficient for MBTCAL computation, means for sparking said spark plug with a timing based on said ignition timing, means for computing an unburnt gas density basic value corresponding to said stoichiometric air-fuel ratio, means for computing a correction coefficient according to said target fuel-air ratio equivalent amount, and means for computing ROU by decreasing said unburnt gas density basic value according to said correction coefficient.

14. An ignition timing controller for use with an engine, said engine comprising an intake passage for aspirating air into a cylinder, a fuel injection valve for injecting fuel into the air aspirated into said cylinder so as to generate an air-fuel mixture, a spark plug for igniting and burning said air-fuel mixture in said cylinder, and an exhaust recirculation mechanism for recirculating part of the exhaust gas from said cylinder into said cylinder, comprising:

means for calculating an ignition timing of said spark plug by the process of:

(a) dividing a total gas weight in cylinder Gcyl by an unburnt gas density ROU in said cylinder and a flame velocity FLVin said cylinder;

(b) adding a firing delay time $B_1$ of said spark plug to a value obtained by the process (a); and (c) converting a value obtained by the process (b) to said ignition timing, means for sparking said spark plug with a timing based on said ignition timing, and means for computing Gcyl by summing a fresh air weight, a fuel weight, a residual gas weight and a weight of gas recirculated by said exhaust gas recirculating mechanism in said cylinder.

15. An ignition timing controller as defined in claim 14, wherein said fresh air weight is the product of a normal air density of air aspirated into said cylinder, a stroke capacity of said cylinder and a charging efficiency of said cylinder.

16. An ignition timing controller as defined in claim 14, further comprising means for calculating an exhaust gas recirculation rate of said exhaust gas recirculation mechanism, and means for calculating said recirculated gas weight depending on said exhaust gas recirculation rate.

17. An ignition timing controller as defined in claim 16, wherein said recirculated gas weight calculating means comprises means for correcting said calculated exhaust gas recirculation rate by a correction coefficient based on a difference between said calculated exhaust gas recirculation rate and a real exhaust gas recirculation rate.

18. An ignition timing controller as defined in claim 16, further comprising means for setting a laminar flow flame velocity basic value when said exhaust gas recirculation rate is zero, and means for computing FLV by decreasing said laminar flow flame velocity basic value according to said exhaust gas recirculation rate.

19. An ignition timing controller for use with an engine, said engine comprising an intake passage for aspirating air into a cylinder, a fuel injection valve for injecting fuel into the air aspirated into said cylinder so as to generate an air-fuel mixture, a spark plug for igniting and burning said air-fuel mixture in said cylinder, and an exhaust recirculation mechanism for recirculating part of the exhaust gas from said cylinder into said cylinder, said controller comprising:

means for calculating an ignition timing of said spark plug using the following equation:

$$MBTCAL = \left( B_1 + \frac{Gcyl}{ROU \cdot FLV} \right) \cdot B_2 - B_3$$

where,

MBTCAL=ignition timing $B_1$=firing delay of spark plug

Gcyl=total gas weight in cylinder

ROU=unburnt gas density in cylinder

FLV=flame velocity in cylinder $B_2$=parameter for converting time to crank angle $B_3$=crank angle correction coefficient for MBTCAL computation, means for sparking said spark plug with a timing based on said ignition timing, and means for computing Gcyl by summing a fresh air weight, a fuel weight, a residual gas weight and a weight of gas recirculated by said exhaust gas recirculating mechanism in said cylinder.

20. An ignition timing controller for use with an engine, said engine comprising an intake passage for aspirating air into a cylinder, a fuel injection valve for injecting fuel into the air aspirated into said cylinder so as to generate an air-fuel mixture, a spark plug for igniting and burning said air-fuel mixture in said cylinder, and a swirl control valve for forming a swirl in said cylinder, said controller comprising:

means for calculating an ignition timing of said spark plug by the process of:

(a) dividing a total gas weight in cylinder Gcyl by an unburnt gas density ROU in said cylinder and a flame velocity FLV in said cylinder;

(b) adding a firing delay time $B_1$ of said spark plug to a value obtained by the process (a); and (c) converting a value obtained by the process (b) to said ignition timing, means for sparking said spark plug with a timing based on said ignition timing, and means for computing FLV depending on an opening of said swirl control valve.

21. An ignition timing controller for use with an engine, said engine comprising an intake passage for aspirating air into a cylinder, a fuel injection valve for injecting fuel into the air aspirated into said cylinder so as to generate an air-fuel mixture, a spark plug for igniting and burning said air-fuel mixture in said cylinder, and a swirl control valve for forming a swirl in said cylinder, said controller comprising:

means for calculating an ignition timing of said spark plug using the following equation:

$$MBTCAL = \left( B_1 + \frac{Gcyl}{ROU \cdot FLV} \right) \cdot B_2 - B_3$$

where,

MBTCAL=ignition timing $B_1$=firing delay of spark plug

Gcyl=total gas weight in cylinder

ROU=unburnt gas density in cylinder

FLV=flame velocity in cylinder $B_2$=parameter for converting time to crank angle $B_3$=crank angle correction coefficient for MBTCAL computation, means for sparking said spark plug with a timing based on said ignition timing, and means for computing FLV depending on an opening of said swirl control valve.

22. An ignition timing controller for use with an engine comprising an intake passage for aspirating air into a cylinder, a fuel injection valve for injecting fuel into the air aspirated into said cylinder so as to generate an air-fuel mixture, a spark plug for igniting and burning said air-fuel mixture in said cylinder, means for detecting an intake air volume in said intake passage, means for detecting a rotation speed of said engine, means for computing a basic injection amount of said fuel injection valve based on the intake air volume and engine rotation speed, means for computing a weighted average value of said basic injection amount, and means for supplying said weighted average value of fuel to said injection valve, said controller comprising:

means for calculating an ignition timing of said spark plug by the process of:

(a) dividing a total gas weight in cylinder Gcyl by an unburnt gas density ROU in said cylinder and a flame velocity FLV in said cylinder;

(b) adding a firing delay time $B_1$ of said spark plug to a value obtained by the process (a); and (c) converting a value obtained by the process (b) to said ignition timing, means for sparking said spark plug with a timing based on said ignition timing, means for setting a charging efficiency of said cylinder by dividing said weighted average value by a weighted average value corresponding to a charging efficiency of 100%, and means for calculating Gcyl based on said charging efficiency.

23. An ignition timing controller for use with an engine comprising an intake passage for aspirating air into a cylinder, a fuel injection valve for injecting fuel into the air aspirated into said cylinder so as to generate an air-fuel mixture, a spark plug for igniting and burning said air-fuel mixture in said cylinder, means for detecting an intake air volume in said intake passage, means for detecting a rotation speed of said engine, means for computing a basic injection amount of said fuel injection valve based on the intake air volume and engine rotation speed, means. for computing a weighted average value of said basic injection amount, and means for supplying said weighted average value of fuel to said injection valve, said controller comprising:

means for calculating an ignition timing of said spark plug using the following equation:

$$MBTCAL = \left( B_1 + \frac{Gcyl}{ROU \cdot FLV} \right) \cdot B_2 - B_3$$

where,

MBTCAL=ignition timing $B_1$=firing delay of spark plug

Gcyl=total gas weight in cylinder

ROU=unburnt gas density in cylinder

FLV=flame velocity in cylinder $B_2$=parameter for converting time to crank angle $B_3$=crank angle correction coefficient for MBTCAL computation, means for sparking said spark plug with a timing based on said ignition timing, means for setting a charging efficiency of said cylinder by dividing said weighted average value by a weighted average value corresponding to a charging efficiency of 100%, and means for calculating Gcyl based on said charging efficiency.

24. An ignition timing control method for an engine wherein a mixture of air aspirated into a cylinder via an intake passage and fuel is ignited by a spark plug and burnt, said method comprising the steps of:

calculating an ignition timing of said spark plug by the process of:

(a) dividing a total gas weight in cylinder Gcyl by an unburnt gas density ROU in said cylinder and a flame velocity FLVin said cylinder;

(b) adding a firing delay time $B_1$ of said spark plug to a value obtained by the process (a); and (c) converting a value obtained by the process (b) to said ignition timing, and sparking said spark plug with a timing based on said ignition timing.

25. An ignition timing control method for an engine wherein a mixture of air aspirated into a cylinder via an intake passage and fuel is ignited by a spark plug and burnt, said method comprising the steps of:

calculating an ignition timing of said spark plug using the following equation:

$$MBTCAL = \left( B_1 + \frac{Gcyl}{ROU \cdot FLV} \right) \cdot B_2 - B_3$$

where,

MBTCAL=ignition timing $B_1$=firing delay of spark plug

Gcyl=total gas weight in cylinder

ROU=unburnt gas density in cylinder

FLV=flame velocity in cylinder $B_2$=parameter for converting time to crank angle $B_3$=crank angle correction coefficient for MBTCAL compution, and sparking said spark plug with a timing based on said ignition timing.

* * * * *